Figure 1:
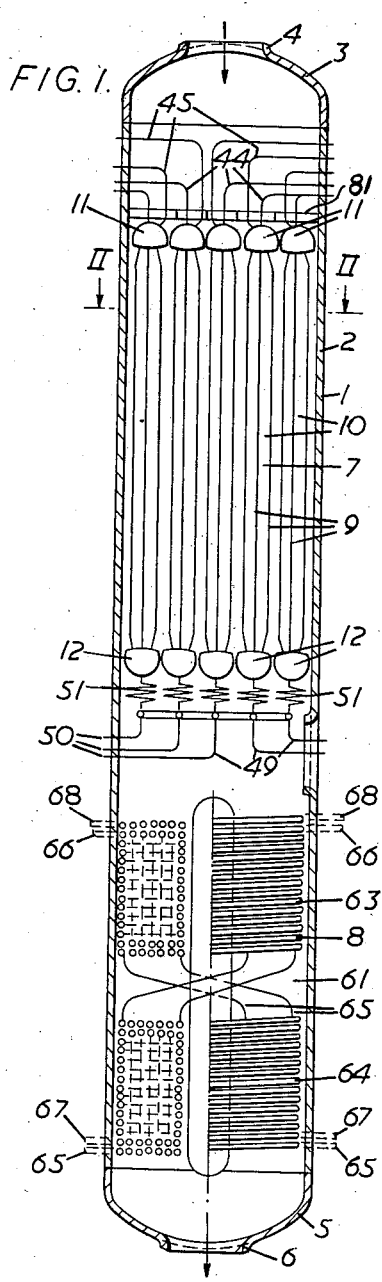

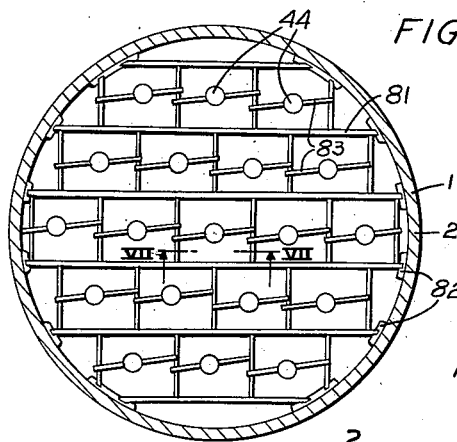
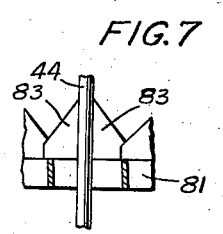
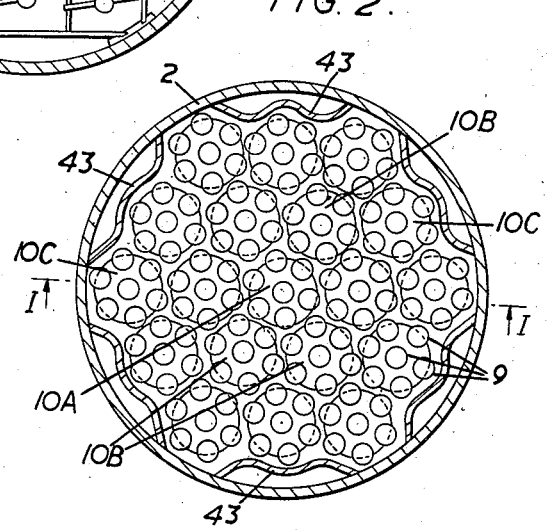
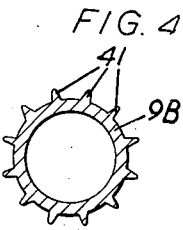

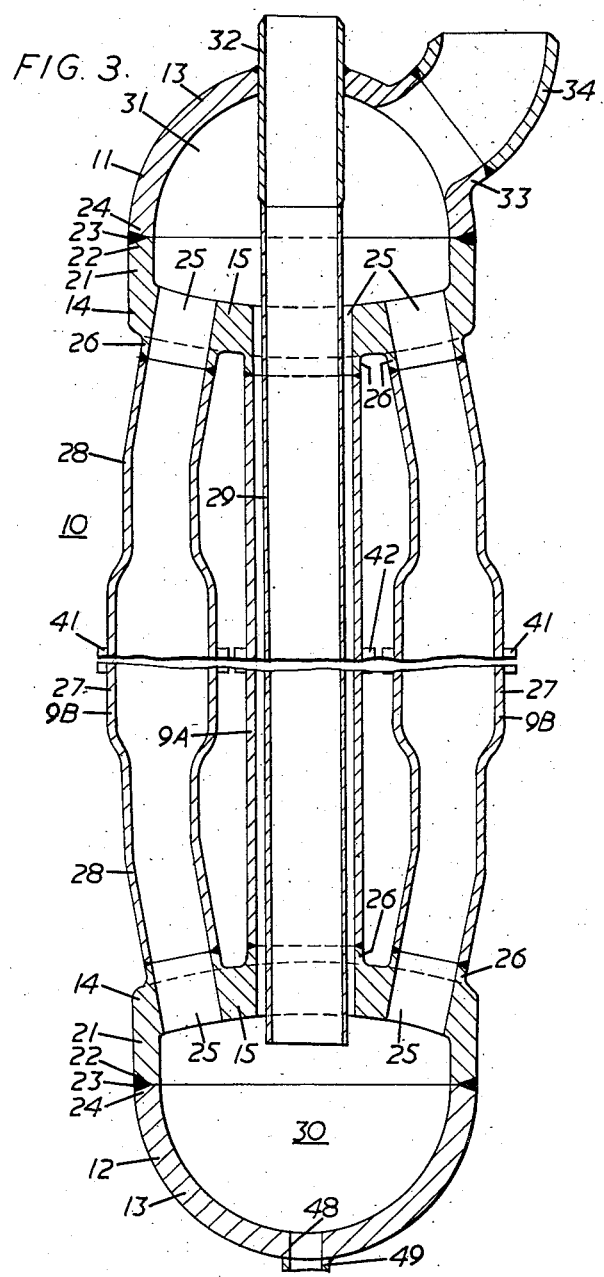

Sept. 24, 1963  J. F. TILLEQUIN ETAL  3,104,652
TUBULOUS VAPOUR GENERATORS
Filed April 16, 1959  4 Sheets-Sheet 4
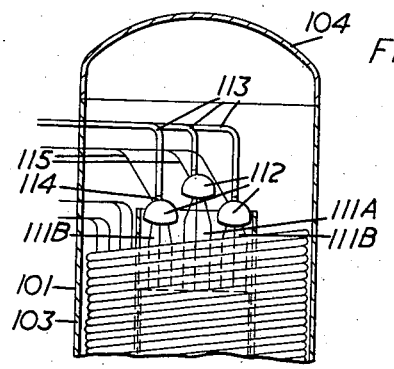
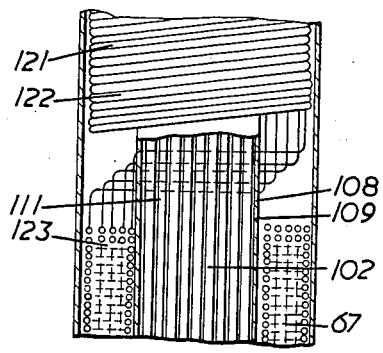
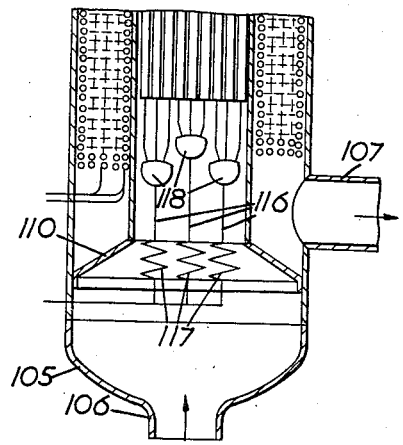
FIG.5.

United States Patent Office 3,104,652
Patented Sept. 24, 1963

3,104,652
TUBULOUS VAPOUR GENERATORS
Jean Frederic Tillequin and Henri B. Blampin, Paris, France, assignors to Babcock & Wilcox Limited, London, England, a British company
Filed Apr. 16, 1959, Ser. No. 806,846
Claims priority, application France Apr. 18, 1958
7 Claims. (Cl. 122—32)

This invention relates to tubulous vapour generators of the kind comprising a vapour generating tube bank arranged within a pressure vessel for convective heating by a stream of heating fluid.

Pressure vessels having steam generating tube banks arranged therein are in many cases appropriately provided when it is desired to withdraw heat from gases or vapour under pressure, e.g. in a nuclear power installation from the cooling gas circulated through the core of a nuclear reactor, or, in certain feed water heating systems in a boiler and turbine power plant, from steam withdrawn from a stage of the turbine. The tube bank may be connected in the natural circulation system of a boiler, the tubes receiving water from an inlet header external to the pressure vessel which is supplied by a downcomer from a drum and passing their steam and water mixtures to an outlet header also external to the pressure vessel whence the mixture is led to the drum for steam and water separation in the latter. The number of tubes in the tube bank and passing through the pressure vessel wall is very large in many such arrangements.

An object of the invention is to provide an arrangement in which the number of tubes passing through the pressure vessel wall and serving the tube bank is reduced, but in which nevertheless in the event of the failure of a tube of the bank the installation may, after at worst a temporary interruption of operation, be operated without a major reduction in the rate of heat exchange until such moment as it may be convenient to repair or replace the defective tube.

A fluid heat exchange installation according to the present invention includes a vertically extending pressure vessel, a heating fluid inlet and a heating fluid outlet in the wall of the pressure vessel, means within the pressure vessel defining a passage for the vertical flow therein of heating fluid passing from the said inlet to the said outlet, a plurality of similar vapour generating units disposed side by side within the said passage for the flow of heating fluid in parallel flow thereover, each vapour generating unit comprising a vertical vapour generating tube extending on the axis of the unit, an annular row of six vapour generating tubes equally spaced from said axis and distributed equiangularly therearound, an upper outlet header and a lower inlet header each formed by a hemispherical part and a dished part comprising a plate convex as seen from the exterior of the header and welded at its edge to the edge of the hemispherical part and formed with a central aperture for the axially extending tube of the unit and an annular row of six apertures for the other six vapour generating tubes of the unit, the vapour generating tubes of the unit connecting at their ends normally with the dished parts at the respective tube apertures therein and the six tubes of the annular row extending vertically over their lengths apart from the end lengths thereof, a straight liquid supply tube extending through the outlet header and extending with annular clearance therearound through the length of the axially extending tube of the unit and having a free lower end and debouching within the inlet header, means for supporting the plurality of vapour generating units through the respective outlet headers thereof, liquid inlet connections leading through the wall of the pressure vessel to the liquid supply tubes of the respective vapour generating units, and vapour and liquid outlet connections leading through the wall of the pressure vessel from the upper outlet headers of the respective vapour generating units.

According to further features of the invention, the supporting means for the vapour generating units comprises a supporting structure extending horizontally across the heating fluid path above the plurality of vapour generating units, and liquid inlet connections which include respective vertical lengths passing through the supporting structure and secured thereto.

The invention will now be described by way of example with reference to the accompanying partly diagrammatic drawings, in which:

FIGURE 1 is an elevation, in section on the line I—I of FIGURE 2, of a heat exchanger tower comprising an upright cylindrical pressure vessel, FIGURE 2 is a plan of the heat exchanger in section on the line II—II of FIGURE 1, FIGURE 3 is a sectional elevation showing the end parts of one of nineteen similar vapour generating units which are accommodated within the pressure vessel, FIGURE 4 is a cross-sectional view of a finned portion of one of the vapour generating tubes of the unit of FIGURE 3, FIGURE 5 is a sectional elevation with intermediate parts broken away of a modified heat exchanger tower, FIGURE 6 is a plan of a grid structure used in the installation of FIGURES 1 to 4 for top-supporting the vapour generating units, and FIGURE 7 is an elevation in section on the line VII—VII of FIGURE 6.

Referring to FIGURES 1 to 3 of the drawings, a cylindrical pressure vessel 1 is supported by suitable means (not shown) with the axis vertical and contains heat exchangers adapted for the withdrawal of heat from a hot gas stream, for example, a stream of coolant gas from a nuclear reactor core, moving vertically downwardly within the pressure vessel.

The pressure vessel 1 consists of a cylindrical shell 2, an upper dished end part 3 welded to the shell 2 and formed with a gas inlet nozzle 4 adapted for the attachment by welding thereto of a gas duct (not shown) for leading the gas stream to the pressure vessel, and a lower dished end part 5 also welded to the shell 2 and formed with a gas outlet nozzle 6 adapted for the attachment by welding thereto of a gas duct (not shown) for leading the gas stream from the pressure vessel. The heat exchangers comprise a steam generating tube bank 7 arranged within the upper part of the pressure vessel and a water heater or economiser 8 arranged within the lower part of the pressure vessel.

The heat exchange surfaces of the steam generating tube bank 7 comprise a multiplicity of finned tubes 9 each extending vertically throughout its length or substantially through its length. The tube bank is formed by nineteen steam generating units 10 each of which comprises a group of seven of the tubes 9 connected at their upper ends to a common outlet header 11 and at their lower ends to a common inlet header 12.

Each of the inlet and outlet headers 11 and 12 consists of two parts welded together, namely a hemispherical part 13 and a dish part 14; the dish part 14 comprises a circular plate 15 with, upstanding therefrom, a rim 21. The edge 22 of the rim 21 is welded at 23 to the edge 24 of the hemispherical part 13. The circular plate 15 is convex as seen from the exterior of the header and is bored at 25 and formed with stubs 26 at the bores adapted for the connection by welding thereto of the ends of the respective seven tubes 9 of the group.

The seven tubes 9 of the group form a cluster of tubes arranged symmetrically in relation to a central axis, which is the axis of one straight, central tube 9A of the group. Arranged around this central tube 9A in an annular row are six tubes 9B equally spaced from the said axis and distributed equiangularly therearound. Each of these six tubes 9B is straight throughout the mid portion 27 thereof, which constitutes most of its length and which extends parallel to the tube 9A, but in the two end lengths 28 thereof is bent so that the tube, at its extremities connecting with the appropriate stubs 26 of the header plate 15, may extend normally to the local surfaces of the plates 15. The end lengths 28 of the tubes 9B are of smaller diameter than the central portions 27 thereof.

The central tube 9A has a diameter uniform throughout its length, which diameter is greater than the diameter of the mid portions 27 of the tubes 9B. Accommodated inside the tube 9A co-axially thereof is a thin-walled supply tube 29, which at its lower end debouches in the space 30 within the lower inlet header 12 and at its upper end is connected, in the space 31 within the upper outlet header 11, with a connector 32 co-linear with the tube 29 and extending through a part of the wall of the hemispherical part 13 of the upper outlet header 11. Another part of the wall of the hemispherical part 13 of the upper outlet header 11 is bored and formed with a stub 33 to which an elbow tube 34 is welded.

Each of the tubes 9B in its mid portion 27 is formed with longitudinally extending fins 41 and the tube 9A of each unit is formed with longitudinally extending fins 42 similar to the fins 41 and having the same length as the fins 41.

Corresponding dimensions of all of the units 10 are identical and their upper outlet headers 11 are all disposed at the same height within the pressure vessel. One of the units, denoted by the reference numeral 10A, is co-axial with the pressure vessel and the remaining eighteen units are clustered symmetrically therearound. Of these eighteen units, six denoted by the reference numeral 10B, are close to the central unit 10A and are equally spaced from the pressure vessel axis and distributed equiangularly therearound. The remaining twelve units, denoted by the reference numeral 10C, are arranged in a row around the seven units 10A and 10B and in the same hexagonal lattice as the said seven units.

This arrangement of units forms a roughly hexagonal tube bank, the size of which is such that the six outermost units of the tube bank, which are alternate units of the twelve units 10C, are adjacent the shell 2. Heating gas flowing downwardly within the pressure vessel flows around and between the upper headers 11, passes longitudinally along the exteriors of the tubes 9 transferring heat to the water therein, and flows around and between the lower headers 12 towards the lower part of the pressure vessel. Between the locations of the shell to which the outermost steam generating units are adjacent baffles 43 are attached to the shell, which are shaped in accordance with the external shape of the tube bank and prevent heating gas flow adjacent the shell between said locations.

The distances between tube axes in the same steam generating unit, the distance between adjacent units and the orientations of the units are such that in the tube bank 7 the tubes are in staggered rectilinear rows. With this arrangement, the heating gas speed downwardly through the tube bank tends to have equal values at all parts of the tube bank.

To the connectors 32 of the steam generating units 10 there are connected by welding respective connecting tubes 44 which, penetrating the shell wall at respective locations, lead to the connectors 32 from outside the pressure vessel. Similarly, to the elbow tubes 34 there are connected by welding respective connecting tubes 45, which, penetrating the shell at respective locations, lead from the elbow tubes to the outside of the pressure vessel. The steam generating tube bank 7 is associated with a steam and water drum; normally water from the water space of the drum flows to the tube bank through the shell wall in the connecting tubes 44 and steam and water mixture from the tube bank flows through the shell wall in the connecting tubes 45, being subsequently separated into steam and water in the drum. Suitably the connecting tubes 44 spring from a common intermediate header to which appropriate water tubes lead from the drum, which is supported to one side of and above the level of the pressure vessel, and the connecting tubes 45 connect into a second intermediate header from which appropriate steam and water mixture tubes lead to the drum.

The hemispherical parts 13 of the lower headers 12 are bored at 48 at the lowest parts thereof and to the units at these bores are connected respective blowdown tube connections 49; these blowdown tube connections lead to respective nozzles 50 in the shell and include within the pressure vessel helically coiled parts 51 of vertical axes which lie below the respective units.

The units 10 are all supported through their upper, outlet headers 11. Suitably, the steam generating units 10 are supported from a horizontal grid structure 81 itself supported from the pressure vessel wall by brackets 82, each steam generating unit 10 being supported through a vertical length of an associated connecting tube 44, welded to a flange structure comprising plates 83 located on opposite sides of the tube 44 and welded to the grid structure.

The water heater or economiser 8 in the lower part of the pressure vessel 1 comprises water tubes disposed in an annular space 61 between the cylindrical shell and an upright gas-diverting body 62 arranged on the axis of the pressure vessel in the lower part thereof. The heater consists of an upper tube bank 63 and, vertically spaced therefrom, a lower tube bank 64; tubes 65 within the space 61 join the tubes of the upper tube bank with respective tubes of the lower tube bank.

Each of the banks 63 and 64 is formed by two radial rows of tubes which ascend helically in the annular space 61 around the pressure vessel axis, the pitch of each helix being double the distance between rows in the same vertical plane. All the tubes of one row are connected for the flow of water therethrough in parallel. Two independent water heater or economiser systems are thus provided by this arrangement, which abstract, for such purposes as may be desired, heat remaining in the gases which have left the steam generating tube bank 7. The reference numerals 65 denote some of the inlet connections and 66 some of the outlet connections for one of the water heater or economiser systems and the reference numerals 67 some of the inlet connections and 68 some of the outlet connections for the other water heater or economiser system.

In the operation of the boiler, flows of water from the steam and water drum of the boiler and through the connecting tubes 44 to the steam generating units 10 and flows of steam and water mixtures from the steam generating units 10 through the connecting tubes 45 and to the drum are established by natural circulation due mainly to the formation of steam bubbles in the tubes 9 of the tube bank. Although the inlet water is caused to traverse the bank from top to bottom before being delivered for evaporative heating in the tubes 9, natural circulation flow is good, for both the relatively high speed of the water flow in the tubes 29 and the presence of the fluid jackets between these tubes 29 and the respective central tubes 9A, which jackets cannot have a higher temperature than the vaporising temperature, entirely or almost entirely preclude the possibility of evaporation in the downflow tubes 29.

Each steam generating unit under heating is free to expand downwardly from its upper header 11. The presence of the blowdown tube connection 49 from the lower header 12 does not preclude such expansion, which is accommodated by flexure as necessary of the helical portion 51 of the blowdown tube connection. Differential thermal expansion between the vaporising tubes 9A and 9B of each unit on the one hand and the downflow supply tube 29 of the unit on the other hand is immaterial, since the latter is secured by its upper end only.

In the event of the failure in service of any one of the tubes 9 of the steam generating tube bank 7, the unit 10 of which the defective tube forms a part is taken out of the working fluid circulation system by interrupting the connecting tubes 44 and 45 of the said unit where they extend outside the pressure vessel and fitting blind nipples thereto. After the stoppage, which need be only relatively short, necessary to effect this action, the operation of steam generation may be continued, if desired, until such time as may be more convenient for repairing the damage or defect. During operation with one steam generating unit out of service, the evaporative capacity of the tube bank is reduced; however, seeing that the inoperative unit is only one out of nineteen units, the evaporative capacity of the bank is reduced by only a small fraction.

When the tube bank is to be repaired, generally it will be necessary to remove from the pressure vessel one or only some of the units 10 constituting the tube bank, thus the work of repair, in which must be included the work of removing radio-active deposits from any tubes which are taken outside the pressure vessel, will usually be less than if the whole tube bank had to be removed from the pressure vessel.

Referring to FIGURE 5, a cylindrical pressure vessel 101 of vertical axis contains a steam generating tube bank 102 arranged for the upward vertical flow of heating gas therethrough.

The pressure vessel 101 consists of a cylindrical shell 103, an upper dished end part 104 and a lower dished end part 105. The lower dished end part is formed with a gas inlet nozzle 106 adapted for connection to a gas duct (not shown). The gas outlet from the pressure vessel is provided by an outlet nozzle 107 which leads laterally from the shell 103 near the lower end thereof. The gas flowing from the inlet to the outlet is constrained to follow an extended flow path by gas guiding means 108 comprising a sheet metal cylinder 109 coaxial with the pressure vessel and extending from a level near the bottom to a level near the top of the cylindrical shell and a frusto-conical lower part 110 bridging the gap between the lower end of the cylinder 109 and the cylindrical shell wall below the outlet nozzle.

With the cylinder 109 extends the steam generating tube bank 102, which is formed by seven steam generating units 111 which are similar to the steam generating units 10 described with reference to FIGURES 1 to 4.

One of the units 111A extends vertically coaxially with the pressure vessel, while the remaining six units 111B are arranged in an annular row equally spaced from the pressure vessel axis and arranged equiangularly around said axis. All the units 111 have the same length and the upper outlet headers 112 of the six units 111B are all at the same height; the central unit 111A occupies a slightly higher position than the six units 111B.

Connecting tubes 113 leading individually from outside the pressure vessel to the connectors 114 in the uppermost parts of the upper outlet headers 112, and connecting tubes 115 leading individually from the outlet headers 113 are arranged similarly to the corresponding connecting tubes described with reference to FIGURES 1 to 4. Similarly, blowdown tubes 116 with helically coiled parts 117 lead from the lowermost parts of the lower inlet headers 118 of the units.

In the annular space between the metal cylinder 109 and the shell is arranged an economiser 121 comprising water tubes assembled into an upper tube bank 122 and a lower tube tank 123. In each bank, each tube descends helically around the pressure vessel axis and the tubes of the upper bank are connected with respective tubes of the lower banks.

Heating gas introduced into the pressure vessel through the inlet nozzle 106 flows upwardly through the tube bank 102 to the upper part of the pressure vessel, turns therein, and flows downwardly through the coils of the economiser 121 in the space outside the metal cylinder 109 to the lower part of the space, whence it leaves the pressure vessel through the outlet nozzle 107.

What is claimed is:

1. In a fluid heat exchange installation, a vertically extending pressure vessel, a heating fluid inlet and a heating fluid outlet in the wall of the pressure vessel, means within the pressure vessel defining a passage for the vertical flow therein of heating fluid passing from the said inlet to the said outlet, a plurality of similar vapour generating units disposed side by side within the said passage for the flow of heating fluid in parallel flow thereover, each vapour generating unit comprising a vertical vapour generating tube extending on the axis of the unit, an annular row of six vapour generating tubes equally spaced from said axis and distributed equiangularly therearound, an upper outlet header and a lower inlet header each formed by a hemispherical part and a dished part comprising a plate convex as seen from the exterior of the header and welded at its edge to the edge of the hemispherical part and formed with a central aperture for the axially extending tube of the unit and an annular row of six apertures for the other six vapour generating tubes of the unit, the vapour generating tubes of the unit connecting at their ends normally with the dished parts at the respective tube apertures therein and the six tubes of the annular row extending vertically over their lengths apart from the end lengths thereof, a straight liquid supply tube extending through the outlet header and extending with annular clearance therearound through the length of the axially extending tube of the unit and having a free lower end and debouching within the inlet header, means for supporting the plurality of vapour generating units through the respective outlet headers thereof, liquid inlet connections leading through the wall of the pressure vessel to the liquid supply tubes of the respective vapour generating units, and vapour and liquid outlet connections leading through the wall of the pressure vessel from the upper outlet headers of the respective vapour generating units.

2. In a fluid heat exchange installation, a vertically extending pressure vessel, a heating fluid inlet and a heating fluid outlet in the wall of the pressure vessel, means within the pressure vessel defining a passage for the vertical flow therein of heating fluid passing from the said inlet to the said outlet, a plurality of similar vapour generating units disposed side by side within the said passage for the flow of heating fluid in parallel flow thereover, each vapour generating unit comprising a vertical vapour generating tube extending on the axis of the unit, an annular row of six vapour generating tubes equally spaced from said axis and distributed equiangularly therearound, an upper outlet header and a lower inlet header each formed by a hemispherical part and a dished part comprising a plate convex as seen from the exterior of the header and welded at its edge to the edge of the hemispherical part and formed with a central aperture for the axially extending tube of the unit and an annular row of six apertures for the other six vapour generating tubes of the unit, the vapour generating tubes of the unit connecting at their ends normally with the dished parts at the respective tube apertures therein and the six tubes of the annular row extending vertically over their lengths apart from the end lengths thereof, a straight liquid supply tube extending through the outlet header and extending with annular clearance therearound through the length of the axially extending tube of the unit and having a free lower end and debouching within the inlet header, a supporting structure extending horizontally across the heating fluid path above the plurality of vapour generating units, liquid inlet connections leading through the wall of the pressure vessel to the liquid supply tubes of the respective vapour generating units, such connections including respective vertical lengths passing through the said supporting structure and secured to said supporting structure, and vapour and liquid outlet connections leading through the wall of the pressure vessel from the upper outlet headers of the respective vapour generating units.

3. A heat exchange installation according to claim 1, wherein the dished part of each header of each vapour generating unit includes a rim upstanding from the convex plate, the edge of the rim being welded to the edge of the hemispherical part of the header.

4. A heat exchange installation according to claim 1, wherein the convex plate of each header of each vapour generating unit is formed with stubs extending normally thereto at the apertures therein for the respective vapour generating tubes, the vapour generating tubes being connected to such stubs.

5. A heat exchange installation according to claim 1, wherein the vapour generating tubes are provided with longitudinally extending fins.

6. A heat exchange installation according to claim 1, wherein the vapour generating tubes are disposed below the heating fluid inlet, an upright fluid-diverting body is arranged on the axis of the pressure vessel below the vapour generating units and a liquid heater is disposed below the vapour generating units comprising tubes coiled helically around the pressure vessel axis in the annular space between the pressure vessel wall and the fluid-diverting body.

7. A heat exchange installation according to claim 1, wherein a cylindrical shell spaced from the pressure vessel wall is disposed co-axially of the pressure vessel, and a liquid heater is disposed in the annular space between the cylindrical shell and the pressure vessel wall comprising tubes coiled helically around the pressure vessel axis.

References Cited in the file of this patent

UNITED STATES PATENTS

| | | |
|---|---|---|
| 1,803,081 | Uhle et al. | Apr. 28, 1931 |
| 2,664,346 | Mayhew | Dec. 29, 1953 |
| 2,672,849 | Fruit | Mar. 23, 1954 |

FOREIGN PATENTS

| | | |
|---|---|---|
| 1,054,671 | France | Oct. 7, 1953 |
| 383,334 | Germany | Oct. 12, 1923 |
| 516,682 | Germany | Jan. 26, 1931 |
| 842,348 | Germany | June 26, 1952 |